(12) United States Patent
Pertsel

(10) Patent No.: US 11,124,143 B1
(45) Date of Patent: Sep. 21, 2021

(54) REDUCING INJURY LIKELIHOOD DURING FRONT COLLISIONS

(71) Applicant: Ambarella International LP, Santa Clara, CA (US)

(72) Inventor: Anthony Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 318 days.

(21) Appl. No.: 16/268,763

(22) Filed: Feb. 6, 2019

(51) Int. Cl.
*B60R 21/02* (2006.01)
*G06K 9/00* (2006.01)
*B60R 21/0134* (2006.01)
*B60R 21/015* (2006.01)
*B60N 2/02* (2006.01)

(52) U.S. Cl.
CPC .............. *B60R 21/02* (2013.01); *B60N 2/02* (2013.01); *B60R 21/0134* (2013.01); *B60R 21/01512* (2014.10); *B60R 21/01554* (2014.10); *G06K 9/00805* (2013.01); *G06K 9/00825* (2013.01)

(58) Field of Classification Search
CPC .............. B60R 21/02; B60R 21/0134; B60R 21/01512; B60R 21/01554; G06K 9/00805; G06K 9/00825; B60N 2/02
See application file for complete search history.

(56) References Cited

U.S. PATENT DOCUMENTS

| 2015/0165937 A1* | 6/2015 | Harda | B60N 2/42 701/45 |
| 2018/0281625 A1* | 10/2018 | Akaba | B60R 21/013 |
| 2020/0377047 A1* | 12/2020 | Ito | B60N 2/14 |

* cited by examiner

Primary Examiner — Brian P Sweeney
(74) Attorney, Agent, or Firm — Christopher P. Maiorana, PC

(57) ABSTRACT

An apparatus includes a capture device and a processor. The capture device may be configured to generate a plurality of video frames corresponding to an area outside of a vehicle. The processor may be configured to perform operations to detect objects in the video frames, determine whether a potential collision is unavoidable based on the objects detected in the video frames and generate a signal if the potential collision is unavoidable. The signal may be configured to move a position of a seat in the vehicle. The position of the seat may be moved before an impact corresponding to the potential collision occurs.

19 Claims, 14 Drawing Sheets

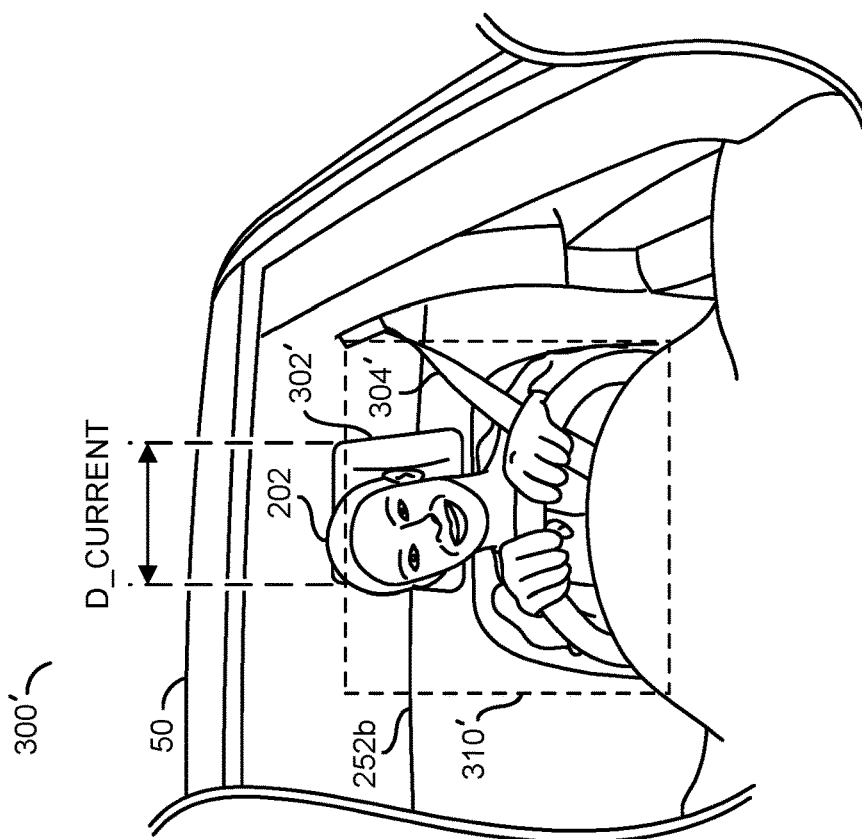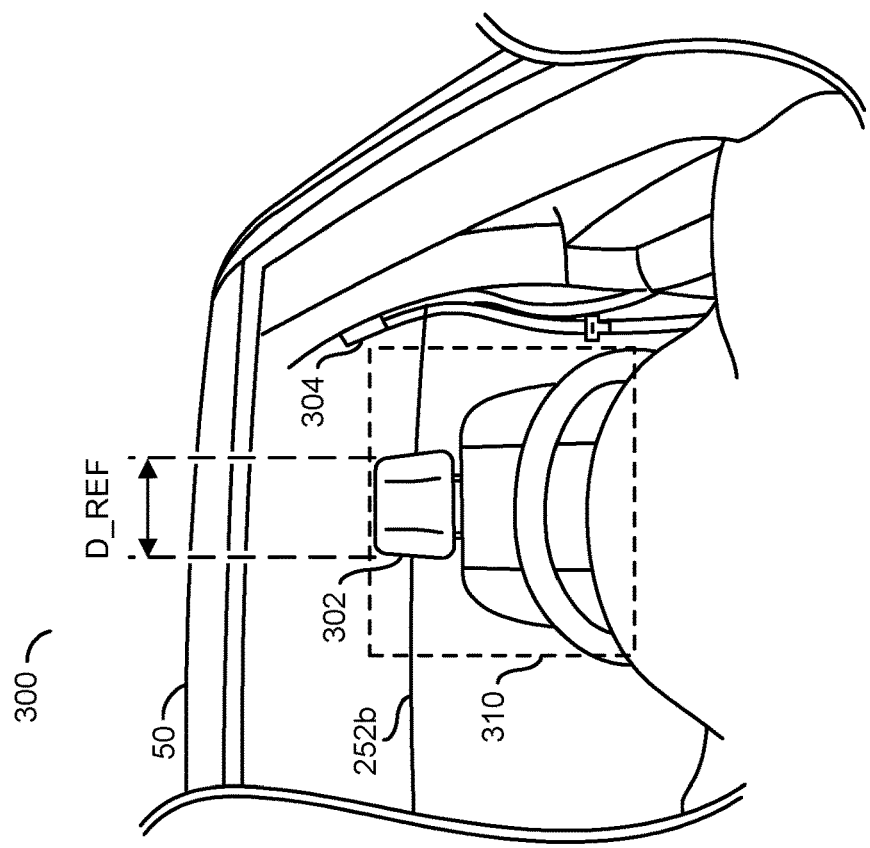
FIG. 5

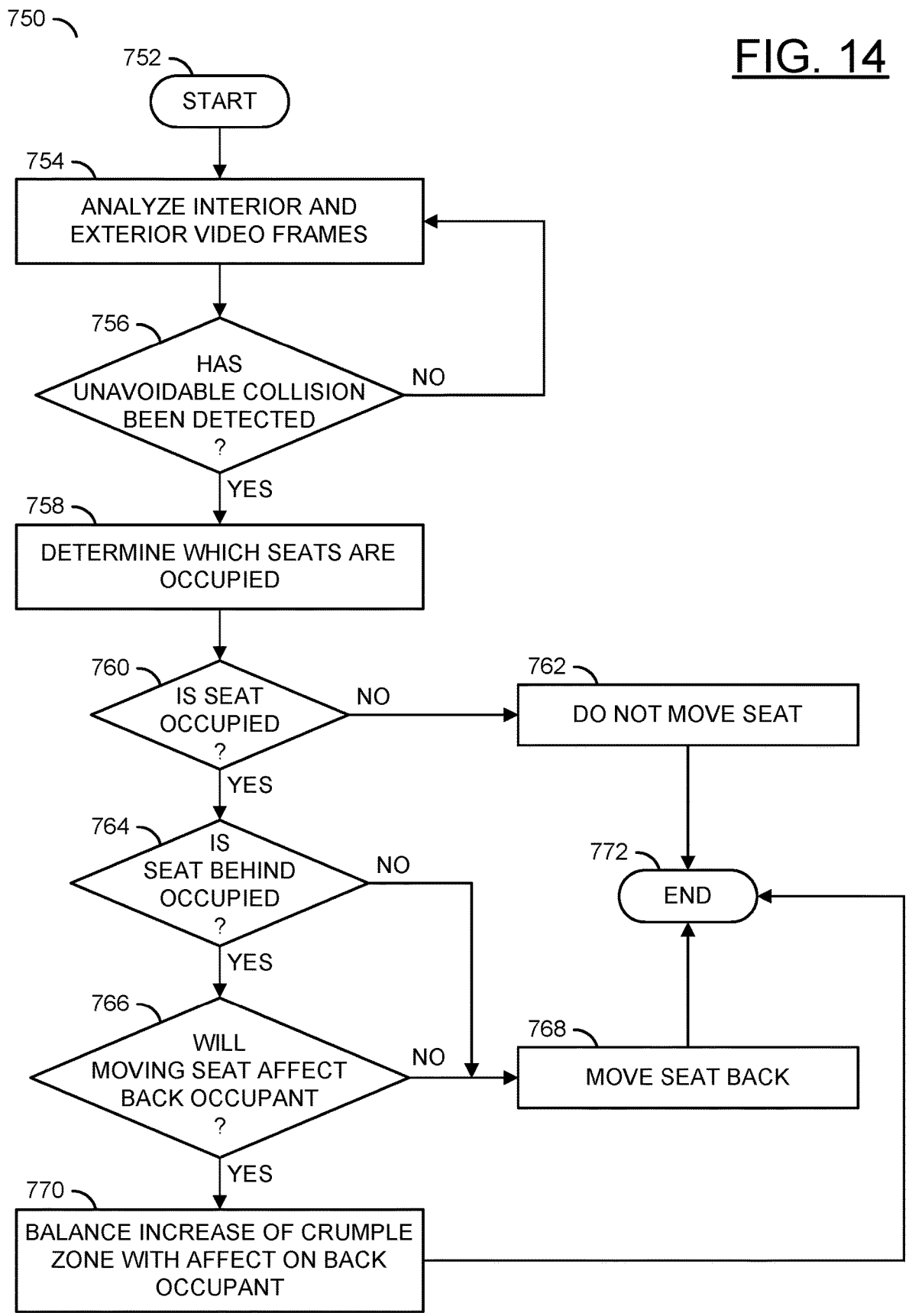

REDUCING INJURY LIKELIHOOD DURING FRONT COLLISIONS

FIELD OF THE INVENTION

The invention relates to computer vision generally and, more particularly, to a method and/or apparatus for implementing reducing injury likelihood during front collisions.

BACKGROUND

Conventional vehicles have the ability to attempt to avoid a collision. For example, utilizing emergency braking or turning the vehicle away from a potential collision can be used to avoid the collision. Attempting to avoid a collision can prevent some crashes. However, in many cases a collision is unavoidable. One way to protect occupants of a vehicle when a collision cannot be avoided is to lessen the impact of the collision.

In a front impact, especially for cars with internal combustion engines that are situated in the front of the car (i.e., the majority of cars on the road today), there is often not enough of a crumple zone for the passengers in the front seats to remain unharmed. Crumple zones heavily influence the safety of the people in a car. Cars are safer than in the past because of the implementation of crumple zones among other safety features, according to a study by the Insurance Institute for Highway Safety (Farmer CM. Relationships of frontal offset crash test results to real-world driver fatality rates. Traffic Inj Prev. 2005).

It would be desirable to implement reducing injury likelihood during front collisions.

SUMMARY

The invention concerns an apparatus comprising a capture device and a processor. The capture device may be configured to generate a plurality of video frames corresponding to an area outside of a vehicle. The processor may be configured to perform operations to detect objects in the video frames, determine whether a potential collision is unavoidable based on the objects detected in the video frames and generate a signal if the potential collision is unavoidable. The signal may be configured to move a position of a seat in the vehicle. The position of the seat may be moved before an impact corresponding to the potential collision occurs.

BRIEF DESCRIPTION OF THE FIGURES

Embodiments of the invention will be apparent from the following detailed description and the appended claims and drawings in which:

FIG. 5 is a diagram illustrating an object comparison between a reference video frame and a captured video frame;

FIG. 14 is a flow diagram illustrating a method for adjusting seat positions based on seat occupancy.

DETAILED DESCRIPTION OF THE EMBODIMENTS

Embodiments of the present invention include providing reducing injury likelihood during front collisions that may (i) increase an amount of available crumple zone in a vehicle, (ii) implement computer vision to detect a potential frontal collision, (iii) adjust a distance of a car seat from the dashboard, (iv) detect whether a front seat is unoccupied, (v) move a seat prior to a collision, (vi) determine a body position of the driver and/or (vii) be implemented as one or more integrated circuits.

Figure 1:
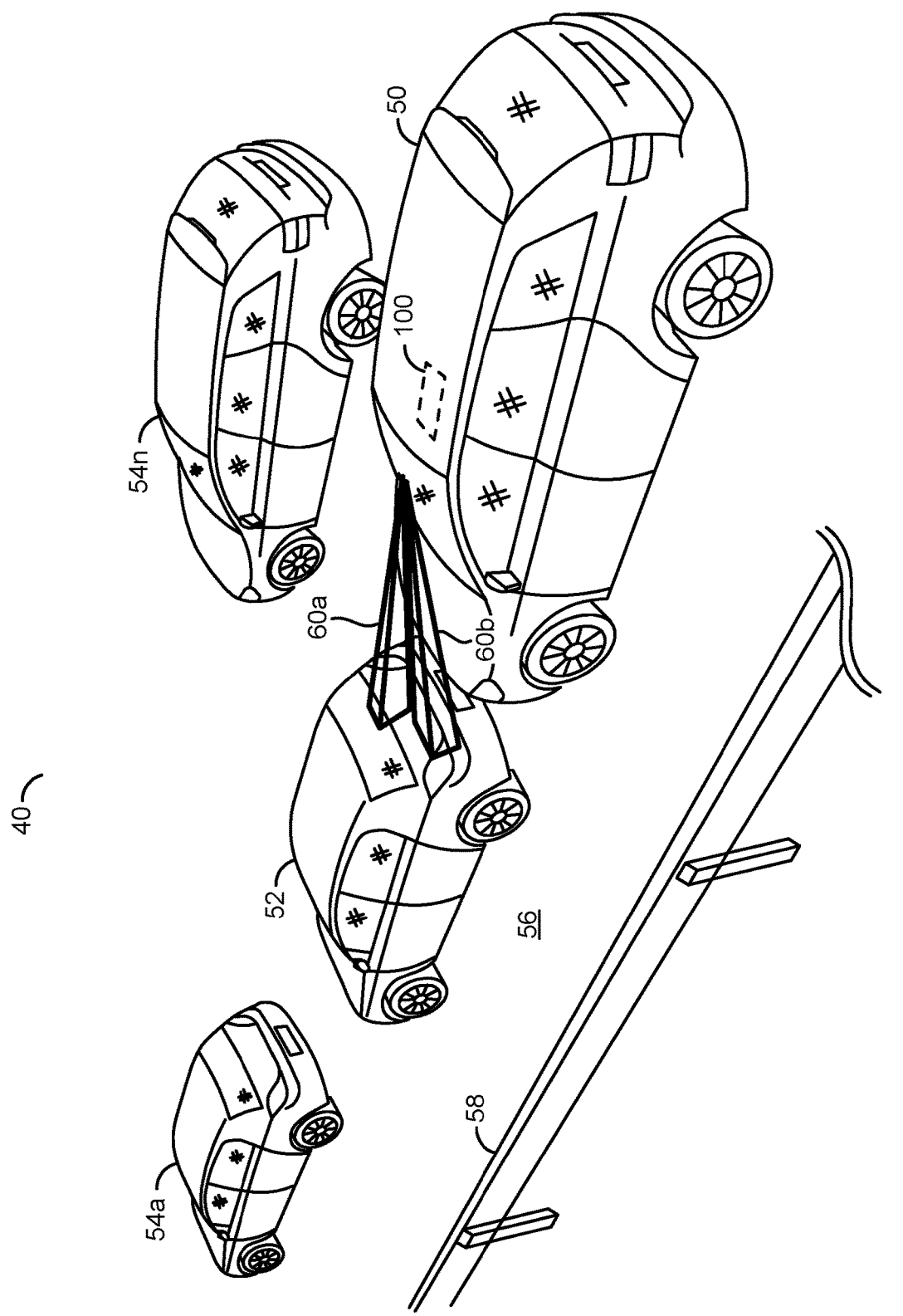
FIG. 1 is a diagram illustrating detecting a frontal collision using computer vision.

Referring to FIG. 1, a diagram illustrating detecting a frontal collision using computer vision is shown. A frontal collision scenario 40 is shown. An ego vehicle 50, a potentially colliding vehicle 52, and vehicles 54*a*-54*n* are shown on a road 56. The guardrail 58 is shown at the edge of the road 56. A block (or circuit, or device, or apparatus) 100 is shown implemented in the ego vehicle 50. The apparatus 100 may be configured to reduce a likelihood of injury during frontal collisions.

In the frontal collision scenario 40, the ego vehicle 50 may collide with the colliding vehicle 52. Camera fields of view (FOVs) 60*a*-60*b* are shown. The apparatus 100 may be configured to analyze the video data captured in the FOVs 60*a*-60*b* by performing computer vision operations. In response to a potential (or imminent) collision detected with the colliding vehicle 52, the apparatus 100 may be configured to increase a size of a crumple zone of the ego vehicle 50 by moving a position of seats within the ego vehicle 50.

The apparatus 100 may comprise implementing computer vision in the ego vehicle 50. Computer vision may enable and/or enhance automatic responses to the detected scenario 40. In one example, computer vision may provide knowledge of a driver and/or passengers in the ego vehicle 50. In another example, computer vision may be used to recognize when a collision is likely and/or imminent. Providing a warning of a potential collision is one example of utilizing computer vision to lessen injury likelihood.

In some scenarios, a crash may be unavoidable. Computer vision may be further utilized to mitigate potential injuries when a vehicle collision is imminent. The apparatus 100 may automatically increase a size of a crumple zone of a vehicle. The crumple zone may be increased by automatic movement of the seats of the ego vehicle 50. The computer vision may be configured to detect whether a collision is imminent and, if the collision is imminent, automatically move the seats away from the front end of the ego vehicle 50.

As soon as the computer vision detects that a possible front collision may be about to happen (e.g., an imminent collision), a response may be performed by the apparatus 100 to initiate a movement of the seats of the ego vehicle 50. The computer vision may be configured to predict a collision multiple seconds before a crash, which may be enough time to move the car seats far back enough to considerably reduce a likelihood of injury of the occupants. Moving the car seats back may increase the crumple zone size and, therefore, reduce the likelihood of injury of the passenger(s). The value of having a large crumple zone may be that the increased crumple zone size provides more space between the occupants of the car and harmful objects that could hit the occupants during a vehicle collision (e.g., shattered glass, the dashboard, the steering wheel, parts of the engine pushing into the cabin, etc.). Generally, the computer vision results may be used in order to move the seats of the vehicle in anticipation of a collision with another vehicle and/or obstacle.

Figure 2:
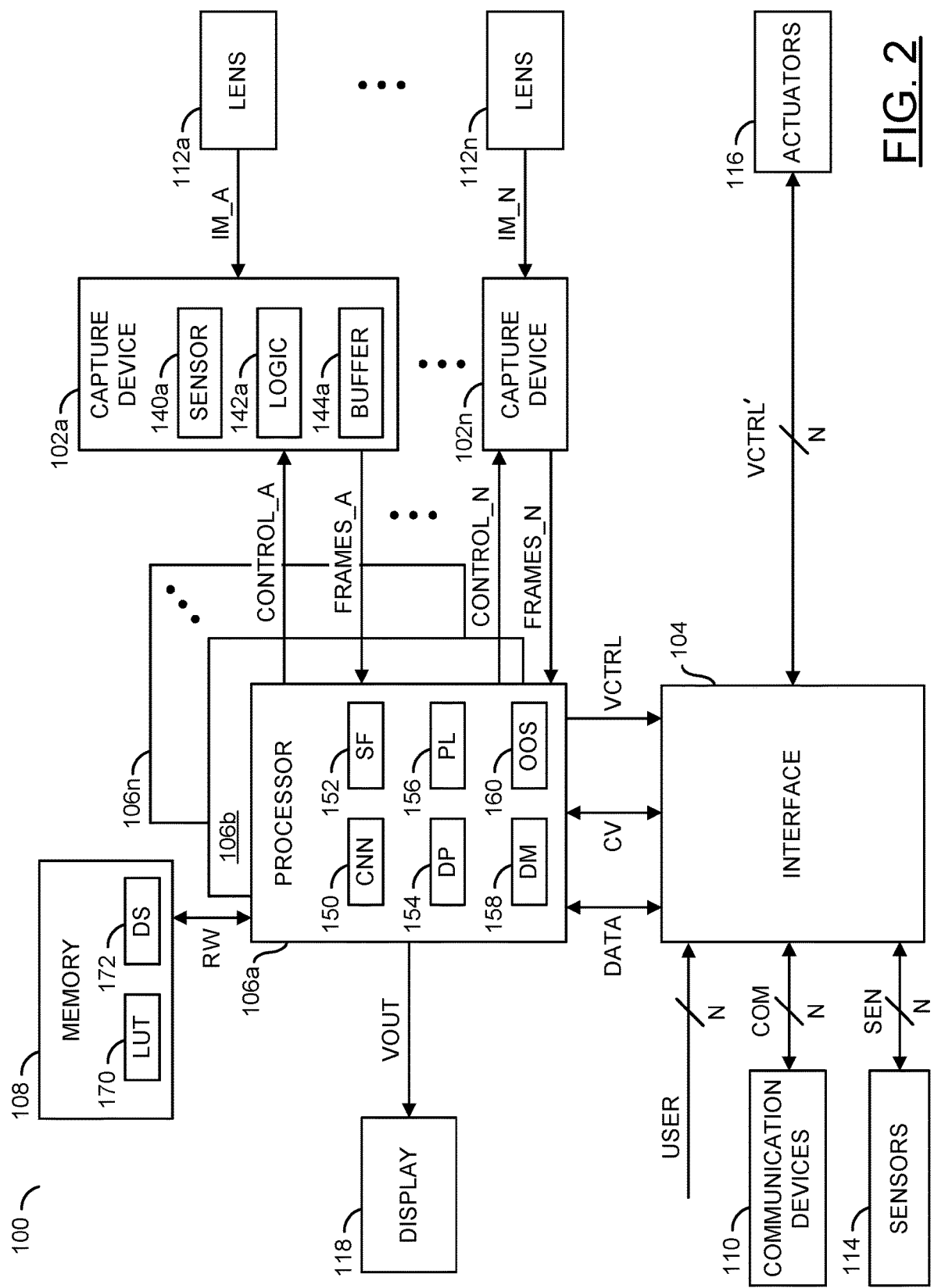
FIG. 2 is a diagram illustrating an embodiment of the present invention.

Referring to FIG. 2, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118 may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map).

In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, a signal (e.g., VOUT) and/or send/receive the signal DATA, the signal CV and/or a signal (e.g., RW). The signal VOUT may provide a video data output to the display 118. For example the processors 106a-106n may be configured to generate the video data (e.g., VOUT) for the display 118 (or multiple displays) in response to the video frames (e.g., FRAMES_A-FRAMES_N. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth©, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision implemented by the CNN module 150 may be described in association with FIG. 6.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation. The decision making module 158 may be further configured to determine the video data to communicate to the display 118. The signal VOUT may be cropped and/or adjusted in response to decisions by the decision making module 158. For example, the decision module 158 may select one field of view (e.g., a wide angle field of view) instead of another field of view (e.g., a narrow angle field of view) to send to the display 118 as the signal VOUT. In another example, the decision making module 158 may adjust output characteristics of the display 118 (e.g., brightness).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 3:
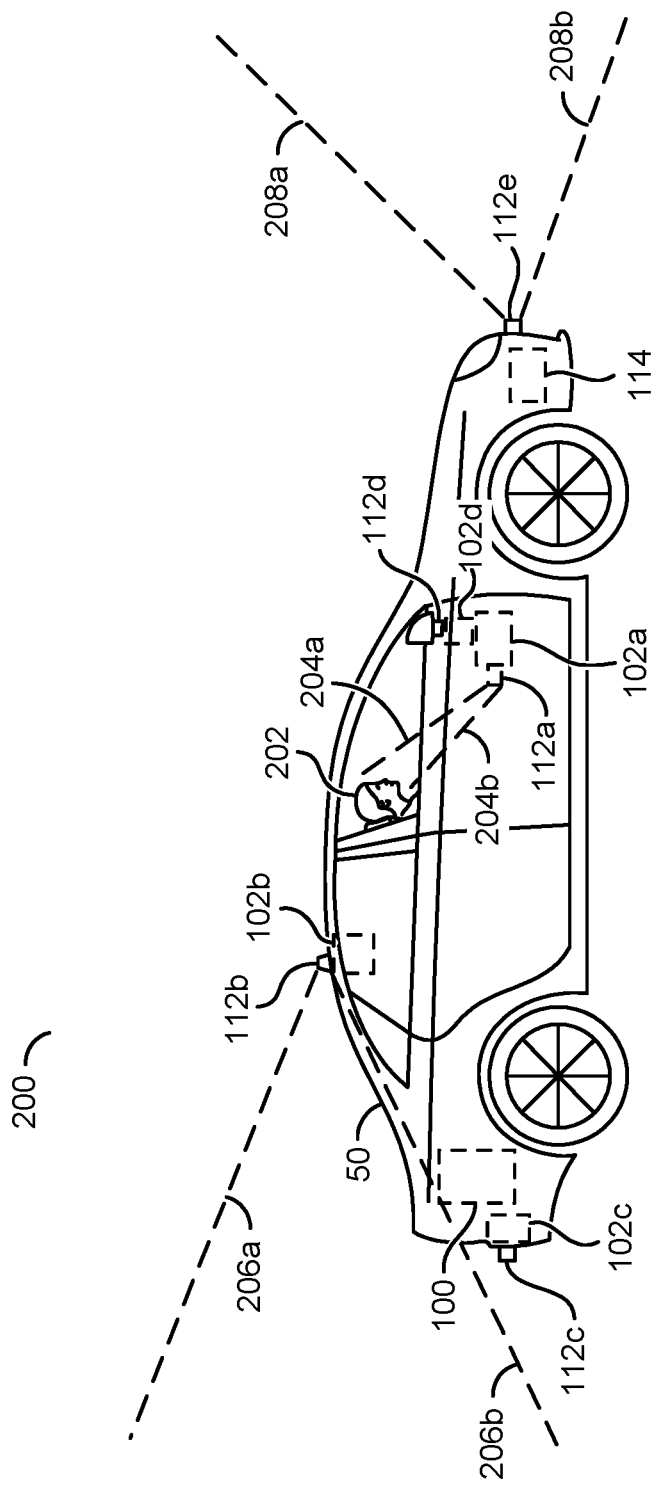
FIG. 3 is a diagram illustrating an example of camera systems inside and outside of a vehicle.

Referring to FIG. 3, a diagram illustrating an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 4:
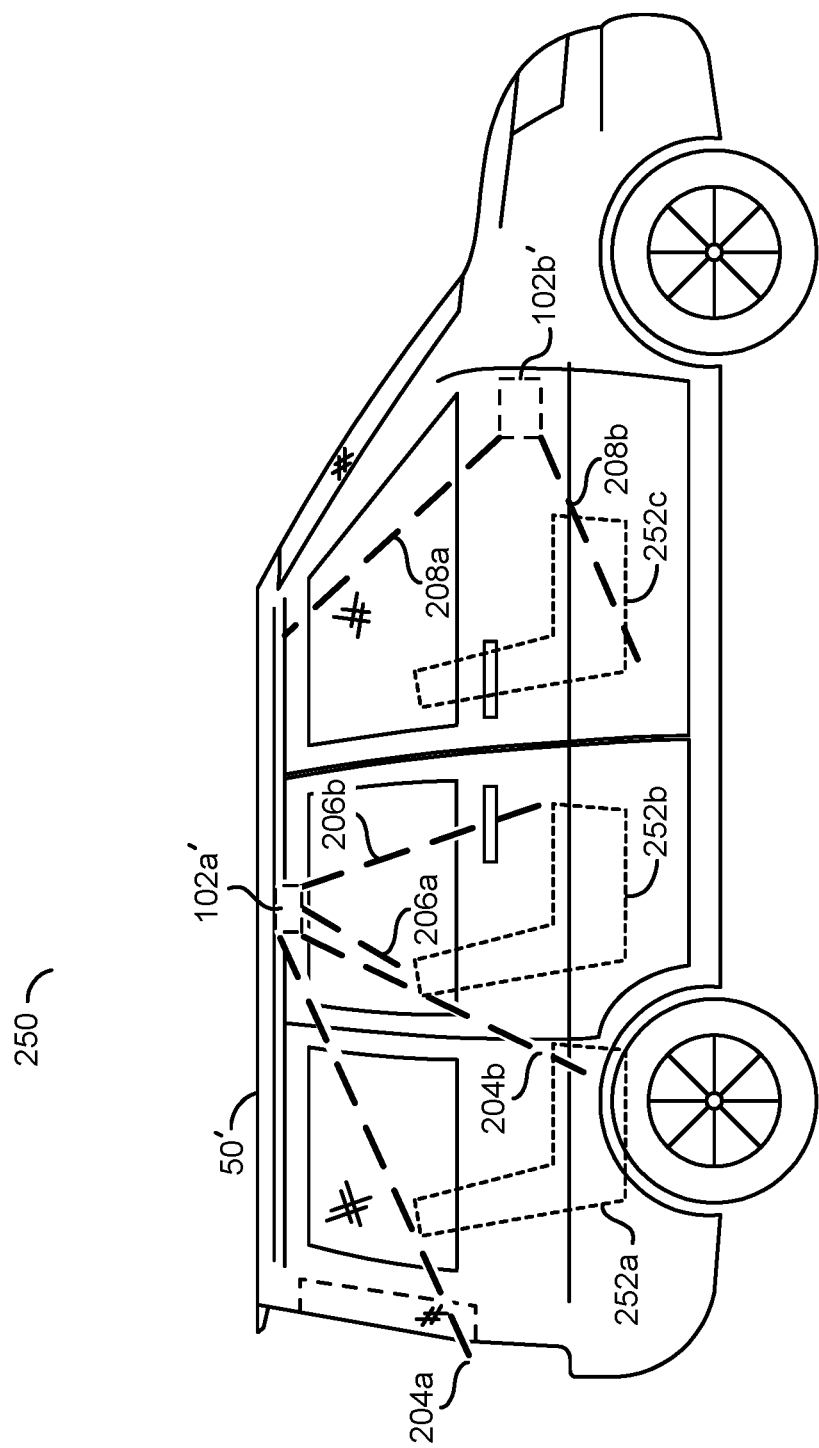
FIG. 4 is a diagram illustrating an example of interior camera systems configured to monitor vehicle occupants.

Referring to FIG. 4, a diagram illustrating an example 250 of interior camera systems configured to monitor vehicle occupants is shown. Various camera angles of an interior of the ego vehicle 50' are shown. Multiple rows of seats 252a-252c are shown in the ego vehicle 50'. Each of the rows of seats 252a-252c may be monitored to detect and/or classify one or more occupants of the ego vehicle 50'. The apparatus 100 may be configured to adjust a position of one or more seats in the rows of seats 252a-252c. The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the display 118). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Referring to FIG. 5, a diagram illustrating an object comparison between a reference video frame and a captured video frame is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 6). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 6:
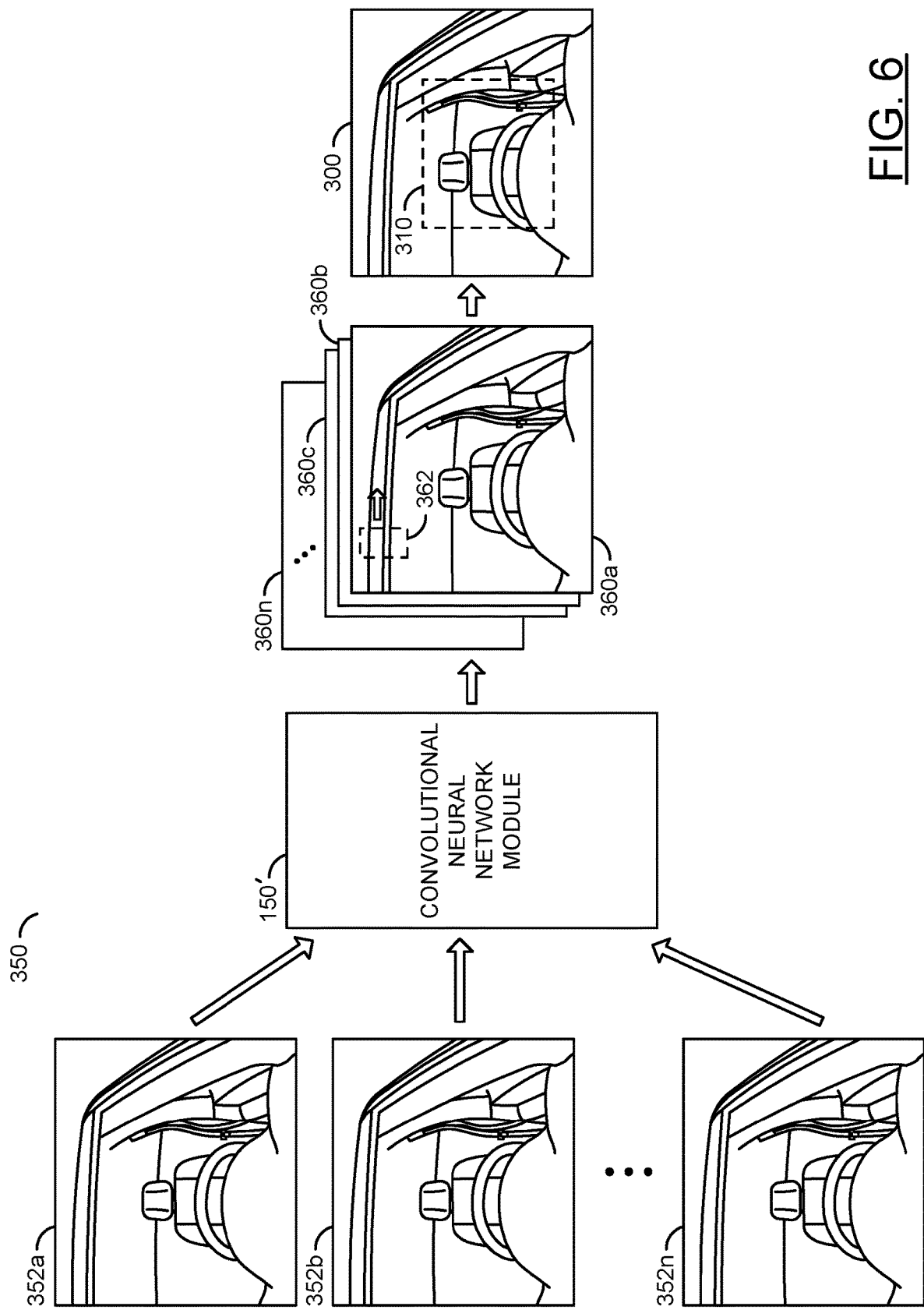
FIG. 6 is a diagram illustrating an example visualization of training a convolutional neural network for object detection using fleet learning.

Referring to FIG. 6, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation. The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps)

of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 7:
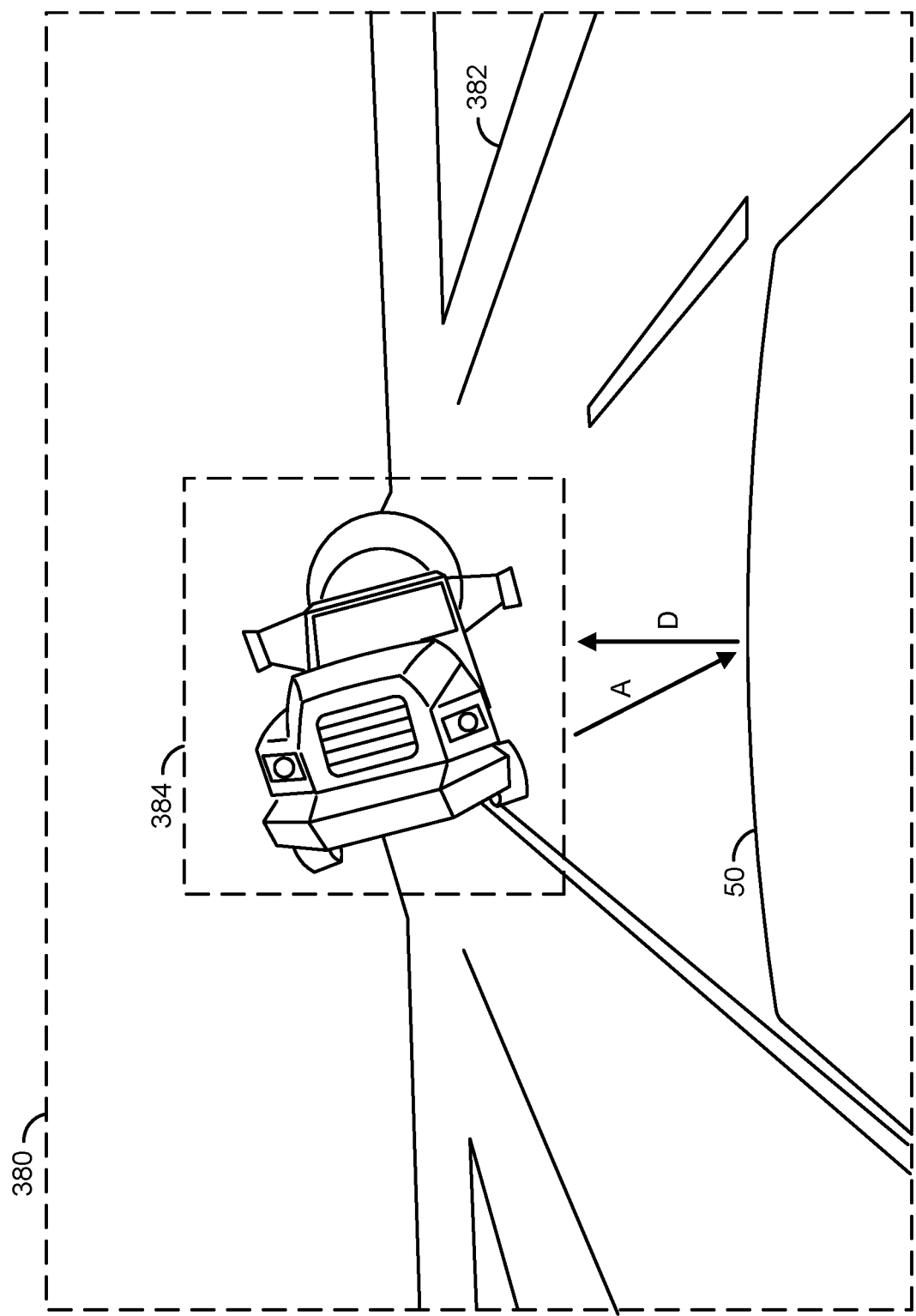
FIG. 7 is a diagram illustrating detecting an unavoidable frontal collision in an example video frame.

Referring to FIG. 7, a diagram illustrating detecting an unavoidable frontal collision in an example video frame is shown. A video frame 380 is shown capturing an example scenario. The video frame 380 may be generated by one of the capture devices 102a-102n configured to capture an area outside of the ego vehicle 50. In the example shown, the video frame 380 may capture the area to the front of the ego vehicle 50. The video frame 380 may be one of a sequence of video frames that may be analyzed using the computer vision operations. The hood of the ego vehicle 50 is shown at a bottom portion of the video frame 380. The apparatus 100 may comprise connections to numerous cameras 102a-102n directed to capture the area outside of the ego vehicle 50 (e.g., forward cameras, reverse/rear cameras, sideward cameras, blind spot cameras, cameras directed towards the ground, 360 degree cameras, etc.). The number and/or types of cameras used to capture the area outside of the ego vehicle 50 may be varied according to the design criteria of a particular implementation.

In the example shown, the area exterior to the ego vehicle 50 captured by the video frame 380 may comprise a road 382. The processors 106a-106n may perform computer vision on the area outside of the ego vehicle 50 to "see" what the driver 202 would see (and more) to make driving decisions (e.g., in autonomous vehicle embodiments), to provide warnings (e.g., in a driver-controlled vehicle embodiment) and/or perform vehicle operations (e.g., such as applying the brakes in a semi-autonomous vehicle embodiment, adjusting a position of a seat, etc.). The processors 106a-106n may analyze, classify and/or recognize objects in the video frame 380 along with analyzing information from the sensors 114 to infer the situation and/or driving scenario (e.g., where the ego vehicle 50 is on the road, what objects are around the ego vehicle 50, how far away are the objects from the ego vehicle 50, what direction is the ego vehicle 50 traveling, what is the path of the road 382, what are the likely trajectories of the objects near the ego vehicle 50, etc.). In one example, the processors 106a-106n may be configured to determine whether the ego vehicle 50 may end up colliding with another object (e.g., a potential collision with another vehicle, a potential collision with a static object such as a sign and/or a lamp post, a potential impact with a pot hole or speed bump, etc.).

A truck 384 is shown. The truck 384 may be a cement truck that is part of oncoming traffic. The truck 384 may be one of the objects detected by the CNN module 150. The CNN module 150 may be configured to determine a shape, orientation and/or arrangement of the object 384. Over a sequence of video frames, including the video frame 380, the CNN module 150 may track the object 384 with respect to the ego vehicle 50. Generally, for oncoming traffic such as the truck 384, the size of the object may increase as the truck 384 passes safely on the road 382 in the lane opposite to the ego vehicle 50.

Based on the computer vision operations performed by the CNN module 150, the decision module 158 may determine the spatial relationship of the ego vehicle 50 to the truck 384. In one example, the decision module 158 may determine that even though the oncoming truck is fast approaching the ego vehicle 50, the oncoming truck 384 may pass by the ego vehicle 50 safely in the next lane. In another example, the decision module 158 may determine that the truck 384 is approaching the ego vehicle 50 and a potential impact may occur. In yet another example, the decision module 158 may determine that the truck 384 is unavoidable and the potential collision is imminent. When the collision with the object 384 is unavoidable, the processors 106a-106n may perform one or more impact mitigation responses. In one example, the impact mitigation response may be generating the signal VCTRL to move a position of a seat and/or increase a size of the crumple zone before an impact corresponding to the potential collision occurs.

A distance D is shown. The processors 106a-106n may determine the distance measurement D from the ego vehicle 50 to the object 384. The distance D may be used to determine whether the potential collision with the object 384 is unavoidable (e.g., imminent). An angle A is shown. The angle A may be an angle of impact. The processors 106a-106n may be configured to detect the object 384 and/or predict a trajectory of the object 384. The processors 106a-106n may further determine a trajectory of the ego vehicle 50 (e.g., based on the computer vision operations and/or reading the sensors 114). The angle of impact A may be determined by the processors 106a-106n based on a projected intersection of the predicted trajectory of the object 384 and the predicted trajectory of the ego vehicle 50.

In the example shown, the CNN module 150 may determine that the truck 384 (e.g., based on the orientation and speed) is approaching the ego vehicle 50 and has tipped over (e.g., an unexpected and/or uncontrollable event). Based on the trajectory of the object 384, a potential collision may occur. Since the truck 384 is out of control and approaching the ego vehicle 50, the potential collision may be imminent. Since the potential collision may be imminent, the truck 384 may be an unavoidable object. The processors 106a-106n may detect the unavoidable object 384 and/or determine the angle of impact A with the unavoidable object 384.

The processors 106a-106n may be configured to generate the signal VCTRL in response to detecting the unavoidable object 384 and/or determining the angle of impact A. For example, the sensor fusion module 152 may cross-reference the information determined based on the computer vision operations and the sensor data from the sensors 114. The decision module 158 may use the cross-referenced information to determine whether the detected object 384 is unavoidable (e.g., a collision is imminent). The decision module 158 may use the cross-referenced information to determine the angle of impact A.

The decision module 158 may compare the angle of impact A with the capabilities of the actuators 116. The actuators 116 may be configured to move the seats of the ego vehicle 50 within the vehicle cabin in particular directions. In one example, the actuators 116 may be configured to move the seats of the ego vehicle 50 forwards and backwards (e.g., along a track). In some embodiments, the actuators 116 may be configured to move the seats in multiple directions (e.g., forward/backwards, left, right, diagonally, etc.). The decision module 158 may determine whether moving the seats of the ego vehicle 50 would mitigate the results of the imminent impact based on the angle of impact A. The decision module 158 may generate the signal VCTRL to adjust the seats in response (e.g., away from) the determined angle of impact A of the potential collision.

In the example shown, the angle of impact A may result in a frontal collision for the ego vehicle 50. If the seats of the ego vehicle 50 are capable of being moved backwards, the ego vehicle 50 may have an increased amount of the ego available to absorb an impact (e.g., a crumple zone), which may mitigate the results of the imminent frontal impact. In another example, if the angle of impact A corresponds to a rear impact, moving the seats backwards may not mitigate the results of the imminent impact (e.g., the occupants of the ego vehicle 50 would be moved closer to the impact location resulting in less available crumple zone). In still another example, if the angle of impact A corresponds to a side impact, moving the seats backwards may not mitigate the results of the imminent impact. However, if the actuators 116 are capable of moving the seats left and right, then the decision module 158 may decide that moving the seats may mitigate the impact.

If the seats of the ego vehicle 50 may be moved by the actuators 116 in a direction that may mitigate the impact based on the angle of impact A, then the processors 106a-106n may move the position of the seats. The processors 106a-106n may generate the signal VCTRL comprising information configured to interface with the actuators 116 that move the seats and provide information about which direction to move the seats (e.g., how far, how fast to move the seats, etc.). In some embodiments, the processors 106a-106n may further take into account an estimated force of the impact. For an example of a low-speed collision (e.g., a fender-bender), moving the seats may not be necessary. In another example, even for a low-speed collision, moving the seat back may protect the occupants (e.g., prevent the knees of the driver 202 from hitting the front panel). The amount of movement and/or the type of collisions that the processors 106a-106n respond to may be varied according to the design criteria of a particular implementation.

Figure 8:
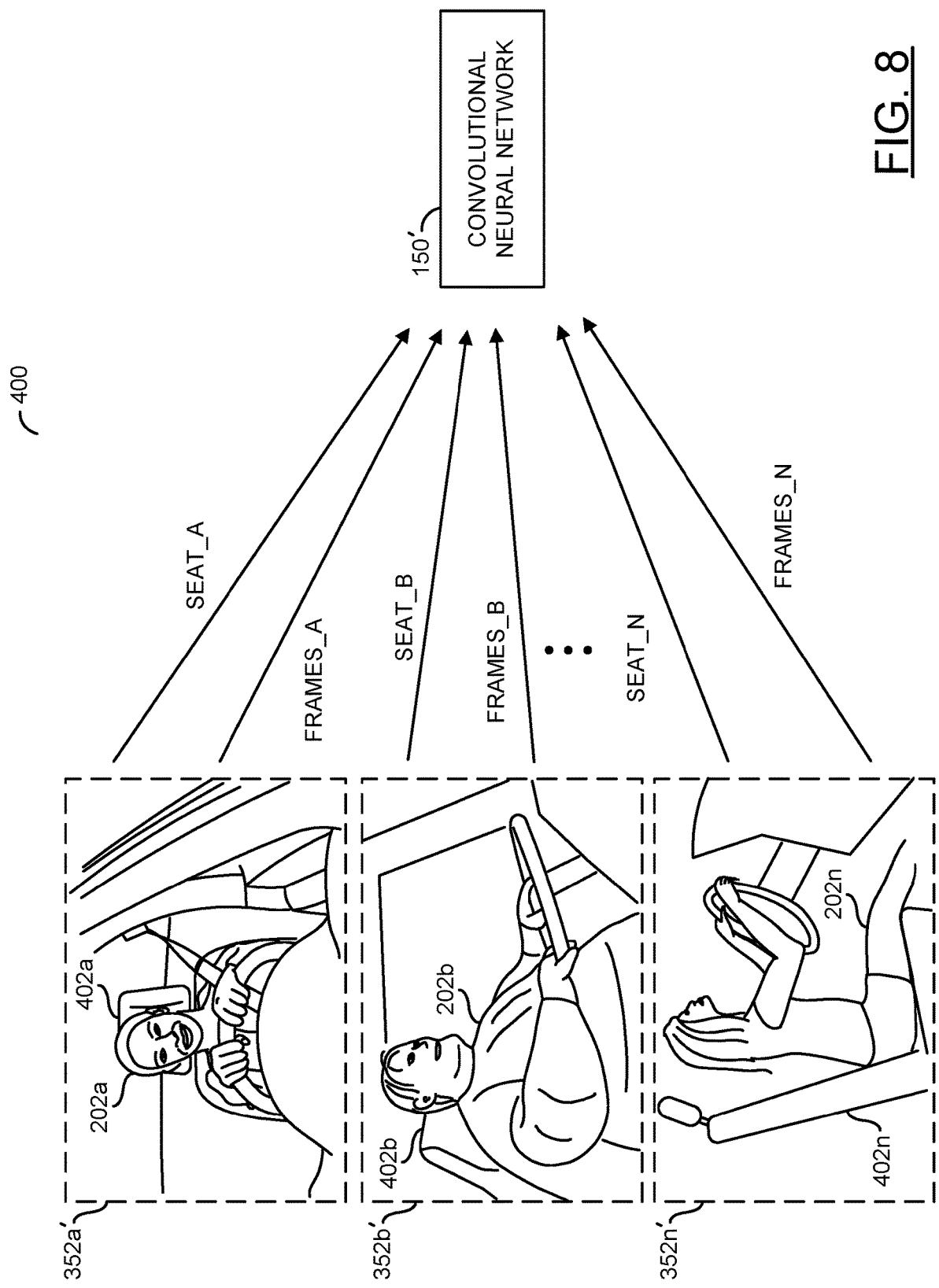
FIG. 8 is a diagram illustrating an example visualization of detecting body types and gathering statistics on seat movement using fleet learning.

Referring to FIG. 8, a diagram illustrating an example visualization of detecting body types and gathering statistics on seat movement using fleet learning is shown. To gather statistical information about body types and seat movement capabilities using computer vision, the convolutional neural network 150' may be trained using training data 352a'-352n'. The training data 352a'-352n' may comprise a large amount of information (e.g., input video frames). The information for the training data 352a'-352n' may be received using the video data (e.g., the signals FRAMES_A-FRAMES_N) processed by the video pipeline module 156. In the example visualization 400 shown, the training data 352a'-352n' may comprise video data from numerous vehicles showing many different drivers 202a-202n.

Fleet learning may be implemented to gather large amounts of the training data 352a'-352n'. For example, cameras may be installed in vehicles to capture many reference images of different types of vehicles showing different drivers and/or occupants to be used as the training data 352a'-352n'. In the example shown, the training data 352a'-352n' may capture an occupied interior of a vehicle showing the drivers 202a-202n and/or the seats 402a-402n. The processors 106a-106n may be configured to move a position of the seats 402a-402n using the signal VCTRL in response to a detection of a potential collision.

In the example shown, the training data 352a'-352n' shows only the drivers 202a-202n, however the training data 352a'-352n' may comprise reference images of other occupants in other seats in the interior of the vehicles. Using the training data 352a'-352n' (e.g., video frames captured from many different vehicles as the vehicles are driven), many training data sets may be available to train the CNN module 150'. In an example, different makes and models of vehicles may be analyzed. In another example, different body types of the users 202a-202n may be analyzed. In yet another example, the position of the seats 402a-402n may be analyzed. In some embodiments, the training data 352a'-352n' may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110). The analysis of the training data 352a'-352n' and/or the computer vision operations performed may be similar to the analysis and/or operations of the CNN module 150' described in association with FIG. 6.

Using fleet learning, the CNN module 150' may generate one or more reference objects that have been sufficiently defined to enable reliable recognition using computer vision. The reference objects may correspond with the various body parts of various body types of the drivers 202a-202n. In one example, the driver 202a shown in the training data 352a' may represent a driver with an average build. In another example, the driver 202b shown in the training data 352b' may represent a driver with a large build. In yet another example, the driver 202n shown in the training data 352n' may represent a short driver (e.g., the driver may have difficulty seeing over the steering wheel). The training data 352a'-352n' may be communicated to the CNN module 150' as the signals FRAMES_A-FRAMES_N.

In some embodiments, the computer vision operations may be further implemented to detect and/or train information about the vehicle components. In the example training data 352a'-352n', the seats 402a-402n are shown. The computer vision operations may be used to detect and/or compile data about the characteristics of the seats 402a-402n (or other vehicle components). For example, the CNN module 150' may determine where the seats 402a-402n are located to determine a seat position in the training data 352a'-352n'. The seat information may be used to determine best practices for moving seats based on the various body types of the drivers 202a-202n.

In some embodiments, the sensors 114 may provide information about the seat location information for the vehicle components along with the video training data. For example, data read from the sensors 114 (e.g., data communicated on the CAN bus) may provide details of various components of the ego vehicle 50. For example, the location of the seats 402a-402n may be read by the sensors 114 and communicated to the CNN module 150' via the interface 104. In the example visualization 400, signals (e.g., SEAT_A-SEAT_N) are shown communicating the seat location information along with the training data in the signals FRAMES_A-FRAMES_N. For example, the signals SEAT_A-SEAT_N may be timestamped to enable the CNN module 150' to associate a data set of seat locations of the ego vehicle 50 with the timestamp of the images in the signals FRAMES_A-FRAMES_N.

The CNN module 150' may be configured to cross-reference the video information about the body types of the users 202a-202n from the training data 352a'-352n' with the seat location for the particular type (e.g., make, model, year, etc.) of the vehicles (e.g., measured by the sensors 114 and/or detected using computer vision). The CNN module 150' may be configured to log statistics cross-referencing how the users 202a-202n look (e.g., body type, gender, build, etc.), the crumple zone of the vehicle 50, and how quickly the seats move. For example, deep learning may be implemented to build pre-set configurations (e.g., the seat movement profiles) based on different combinations of characteristics of the users 202a-202n and/or the vehicle components. Cross-referencing the body type and/or the body position of the users 202a-202n with the characteristics of the vehicle 50, the decision module 158 may determine when the reaction (e.g., the seat movement) should be performed when a potential and/or imminent collision is detected for a particular scenario (e.g., body size, how close the occupant is sitting to the front of the vehicle 50, etc.). For example, the signal VCTRL may be configured to cause the seats 402a-402n to move based on the body position of the users 202a-202n. In another example, the signal VCTRL may be configured to cause the seats 402a-402n to move based on the body size of the users 202a-202n (e.g., the seats 402a-402n may be moved back earlier for a larger person that takes up more of the available space that could be used for the crumple zone than for a smaller person).

In one example, the characteristics of the driver 202a in the training data video frame 352a' may be a female driver with an average height and average build. Using the seat information SEAT_A and the body type of the driver 202a in the training data video frame 352a' the CNN module 150' may develop a seat movement profile for female drivers with an average height and average build. The seat movement profile may provide details of when to move the seat 402a back and/or how fast to move the seat 402a back to ensure there is enough time to move the body out of the increased crumple zone. The CNN module 150' may refine the seat movement profile for the female drivers with an average height and average build using the training data 352a'-352n' that also includes other female drivers with an average height and average build. When one of the drivers 202a-202n is driving the ego vehicle 50 and is determined by the processors 106a-106n to have characteristics of a female driver with an average height and average build, the decision module 158 may move the seats 402 based on the characteristics of the driver 202 and the characteristics of the vehicle 50.

Similarly, the CNN module 150' may develop seat movement profiles for the different body types and/or vehicle types. For example, using the driver 202b in the training data video frame 352b' (and other training data that correspond to body types similar to the driver 202b), the CNN module 150' may develop a seat movement profile for a male driver with a large, husky build. The seat 402b may be moved backwards earlier for the larger driver 202b to ensure that there is enough time for the driver 202b to be moved back far enough to mitigate the result of the impact. In another example, using the driver 202n in the training data video frame 352n' (and other training data that correspond to body types similar to the driver 202n), the CNN module 150' may develop a seat movement profile for a female driver with a short height.

The seat movement profiles developed using fleet learning may be developed statistically. The statistically developed seat movement profiles may be implemented to balance impact mitigation with false positives (e.g., moving the seats 402a-402n when no impact occurs). For example, the short driver 202n sitting close to the steering wheel may have difficulty reaching the gas/brake pedals when the seat 402n is moved far away and moving the seat 402n back too soon may make it difficult for the driver 202n to control the vehicle 50. However, since the driver 202n and seat 402n are closer to the steering wheel more time is needed to move the seat 402n back (e.g., a larger amount of distance to travel). To ensure that there is enough time to move the driver 202n away from the impact, the processors 106a-106n may move the seat 402n back earlier than when the driver 202n is farther away from the steering wheel. The trade-off may be between driving comfort and protection of the driver 202n.

Based on the statistical information gathered based on fleet learning, the processors 106a-106n may have a greater amount of information to rely on to decide when to generate the signal VCTRL. For example, if the actuators 116 of the vehicle 50 are capable of moving the seat 402n at a high rate of speed, then the processors 106a-106n may be able to wait until the collision is imminent before moving the seat 402n back (e.g., disrupting the driving ability of the driver 202n by moving the seat 402n may be irrelevant because the impact is imminent). In another example, if the actuators 116 of the vehicle 50 are not capable of moving the seat 402n at a high rate of speed, then the processors 106a-106n may start moving the seat 402n back before the impact is imminent (e.g., the driving ability of the driver 202n may be disrupted by the earlier movement of the seat 402n even though the collision may still be avoided).

Other characteristics of the drivers 202a-202n may be considered when determining when and how fast to move the seats 402a-402n. For example, if computer vision operations detect that the driver 202 is pregnant, the seat 402 may be moved earlier (e.g., to ensure that the body of the driver 202 does not come into contact with the steering wheel). Generally, the position of the seats 402a-402n may be determined before the crash is detected (e.g., when the collision is considered a possibility and/or imminent but has not occurred) and if a person sits close to the front the car 50 then the processors 106a-106n may be more wary of front collisions and be more inclined to move the seats 402a-402n earlier. The information used to determine when and how to move the seats 402a-402n and/or the seat movement responses to the information may be varied according to the design criteria of a particular implementation.

Figure 9:
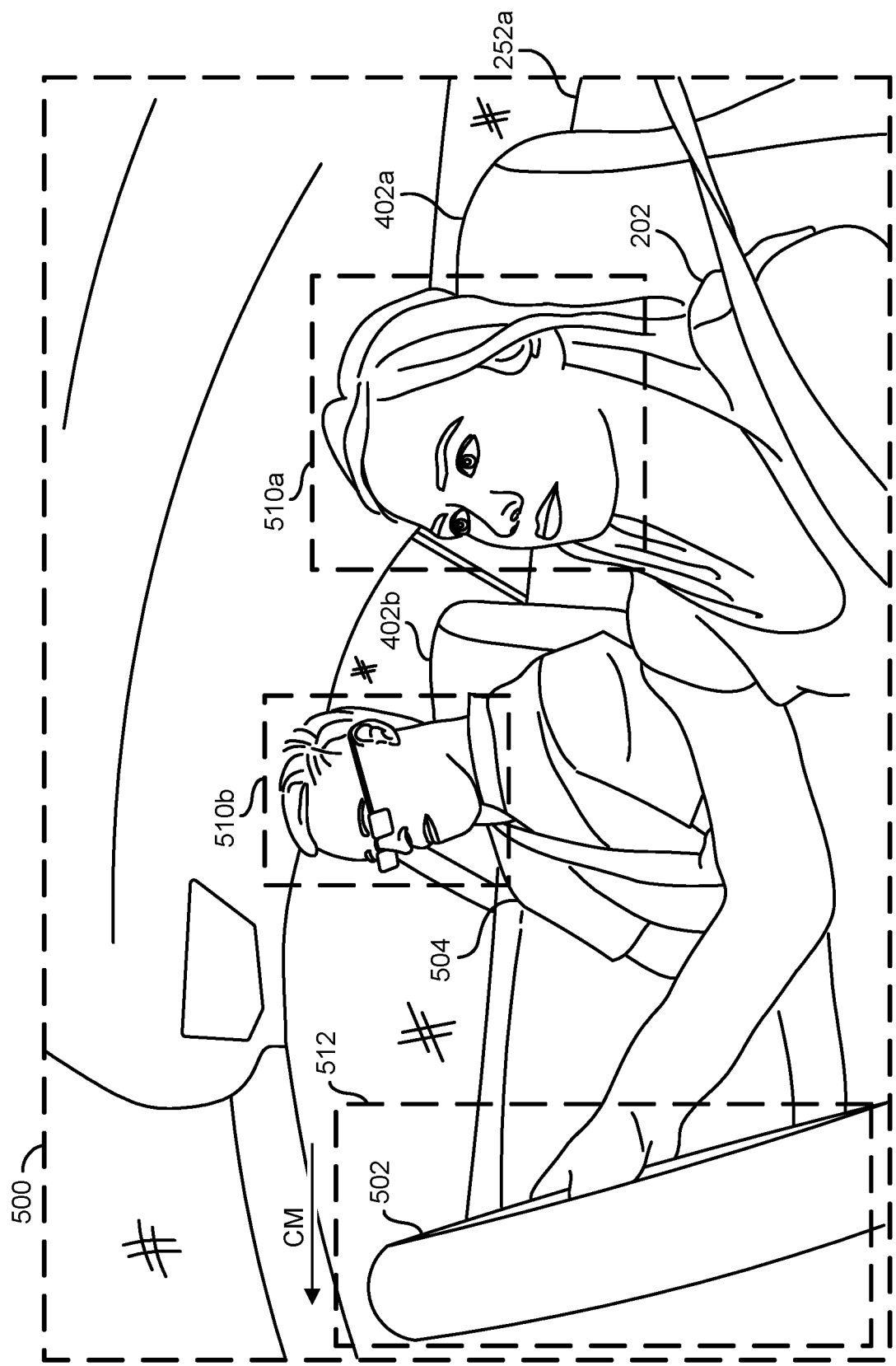
FIG. 9 is a diagram illustrating a processor detecting a young driver and an adult passenger.

Referring to FIG. 9, a diagram illustrating a processor detecting a young driver and an adult passenger is shown. An example video frame 500 is shown. The example video frame 500 may be a video frame of the interior of the vehicle 50 captured by one of the capture devices 102a-102n. The example video frame 500 may be a video frame capturing a front row of seats of the interior of the vehicle 50. For example, a steering wheel 502 is shown in the interior of the vehicle 50.

The driver 202 and an occupant 504 are shown in the video frame 500. The seats 402a-402b are shown in the video frame 500. The driver 202 may be in the driver seat 402a. The occupant 504 (e.g., the passenger) may be in the passenger seat 402b. The steering wheel 502 is shown in front of the driver 202. In an example, the steering wheel 502 may be one potentially harmful object that could hit the driver 202 as a result of a vehicle collision. The back row of seats 252a is shown behind the seats 402a-402b (e.g., unoccupied in the example shown).

Boxes 510a-510b may represent the faces detected by the processors 106a-106n. The face 510a may be the face of the driver 202. The face 510b may be the face of the passenger 504. The processors 106a-106n may further detect the seats 402a-402b. The processors 106a-106n may detect that the face 510a corresponds to the driver 202 located in the driver seat 402a. The processors 106a-106n may detect that the face 510b corresponds to the passenger 504 located in the passenger seat 402b.

A box 512 may represent one or more components of the interior of the ego vehicle 50 detected by the processors 106a-106n. In the example shown, the component of the vehicle 512 may be the steering wheel 502. In another example, the component of the vehicle 512 may correspond to the seats 402a-402b. In yet another example, the component of the vehicle 512 may correspond to the dashboard. The number and/or types of components of the vehicle 50 may be varied according to the design criteria of a particular implementation.

The CNN module 150 may be configured to determine current characteristics of the components 512 of the vehicle 50. In one example, the CNN module 150 may determine the current location of the seats 402a-402b and/or the current angle of recline of the seats 402a-402b. The current location and/or current recline of the seats 402a-402b may be an example of current characteristics of the components of the vehicle 50. The driver 202 is shown holding a steering wheel 502. The CNN module 150 may be configured to detect and/or classify the object 512 as the steering wheel 502. The CNN module 150 may be further configured to detect a location and/or angle of the steering wheel 502 (e.g., a current configuration and/or orientation of a component of the vehicle 50).

The processors 106a-106n may be configured to determine the characteristics of the driver 202 and the passenger 504 (and any other occupants) for a particular one of the seats 402a-402b. For example, the driver 202 may have one seat movement profile for the driver seat 402a and another seat movement profile for the passenger seat 402b. Similarly, the occupant 504 may have one seat movement profile for the passenger seat 402b and another seat movement profile for the driver seat 402a. Depending on which seat the driver 202, the occupant 504 and/or other occupants are sitting in, the seat movement profile may be different and/or the reaction generated may be different (e.g., a short person may sit close to the steering wheel 502 in the driver seat 402a but may sit farther away when in the passenger seat 402b). Different seats may have different variables and/or settings for the seat movement profile (e.g., some seats may move faster or slower, some seats may have a greater range of motion, etc.). In some embodiments, the seat movement profile may be individualized for a particular occupant. For example, when facial recognition is implemented by the processors 106a-106n, the user may be identified as a particular person with a high level of confidence. For example, the face 510a may be recognized as Alice and the face 510b may be recognized as Bob, and the memory 108 (or a memory of the vehicle 50) may store seat movement profiles individualized for Alice and Bob.

The characteristics of the driver 202, the occupant 504 and/or other occupants may be determined at varying levels of granularity, according to the design criteria of a particular implementation. For example, the driver 202 may be determined to have the characteristics of a young female (e.g., a low level of granularity). In another example, the driver 202 may be determined to be a female that is five feet, five inches tall (e.g., a medium level of granularity). In yet another example, the driver 202 may be determined to have an upper body length of a particular size, a leg length of a particular size, an arm length of a particular size, etc. (e.g., a high level of granularity). Detecting the characteristics of each occupant with a high level of granularity may provide a greater amount of data for the decision module 158 to make decisions about how to move the seats 402a-402b.

The processors 106a-106n may be configured to detect a presence of the driver 202, the passenger 504 and/or other occupants (e.g., using computer vision operations and/or data from the sensors 114 such as seat pressure detection). The processors 106a-106n may initiate the movement of the seats 402a-402n based on a presence of a person in the seats 402a-402n. In the example shown, the driver seat 402a is occupied by the driver 202 and the passenger seat 402b is shown occupied by the passenger 504. In the event of a frontal collision detection, the processors 106a-106n may move both the seats 402a-402b backwards in order to increase the amount of available crumple zone for both occupants. The processors 106a-106n may not move the seats 402a-402n that are not occupied. In another example, if the driver seat 402a is occupied by the driver 202 and the passenger seat is not occupied then in the event of a frontal collision, the processors 106a-106n may move the seat 402a backwards, but may not move the seat 402b. Since moving the seat 402b is not occupied, moving the seat 402b may be irrelevant to mitigating the results of the impact.

The presence of the driver 202, the passenger 504 and/or other occupants may affect the movement of other seats in the vehicle 50. In the example shown, no occupant is behind the driver seat 402a. If there is no individual in the back seat, then the processors 106a-106n may cause the seat 402a and/or the seat 402b to move back as far as possible in the given time frame when a potential collision is detected. If the movement of the seats 402a-402n may affect another of the occupants in the vehicle 50, then the processors 106a-106n may adjust the movement of the seats 402a-402n to accommodate all occupants. For example, if there is an individual in the back seat, then the processors 106a-106n may be configured to balance the impact mitigation for the driver 202 by moving the seat 402a backwards, with the amount of space for the person occupying the back seat (e.g., the result of moving the seat 402a backwards into the space occupied by another occupant). For example, in a small car, a person in the back row of seats 252a may have a small amount of leg room and forcing the driver seat 402a may crush the legs of the occupant in the back row of seats 252a.

To address the problem of having a person in the back row of seats 252a, the processors 106a-106n may be configured to detect body characteristics (e.g., body size, leg size, amount of space occupied, etc.) in addition to the presence of the occupants. For example, the video frames captured by one or more of the capture devices 102a-102n that are interior-facing may be analyzed using the computer vision to sense if there is a person there and/or to sense the size of the person. Based on the size of the person in the back row of seats 252a, the processors 106a-106n may adjust the amount of movement of the front seats 402a-402b. In one example, if the person in the back seat 252a is large (e.g., the legs are large and are almost touching the back of the seat 402a), then the distance that the seat 402a is moved may be reduced. In another example, if the person in the back seat 252a is small (e.g., the legs are small and there is a lot of room between the person in the back row of seats 252a and the front seat 402a), then the seat 402a may be moved back as far as possible. The processors 106a-106n may move the car seat 402a back but still a safe distance from the person in the rear seat 252a. In some embodiments, to protect the occupants of the front seats 402a-402b from the force of the collision, the seats 402a-402b may be moved back even if the movement causes some discomfort to the occupants in the back row of seats 252a.

In some embodiments, the processors 106a-106n may be configured to classify the component 512 of the vehicle 50 as a potentially dangerous object. For example, force from an impact may result in the driver 202 hitting the steering wheel 502. One or more of the components 512 may be controllable by the actuators 116. For example, many vehicles electronic adjustment of the steering wheel 502. In response to the detected potential impact, the processors 106a-106n may generate the signal VCTRL to adjust the position of the seats 402a-402n and/or adjust the position of the component 502. In the example shown, the steering wheel 502 may be moved a distance (e.g., CM) towards the front of the ego vehicle 50 (e.g., away from the driver 202). Similarly, other components 512 that are capable of being moved by the actuators 116 may be moved away from the occupants of the ego vehicle 50 (e.g., a dashboard, an infotainment system, etc.).

Figure 10:
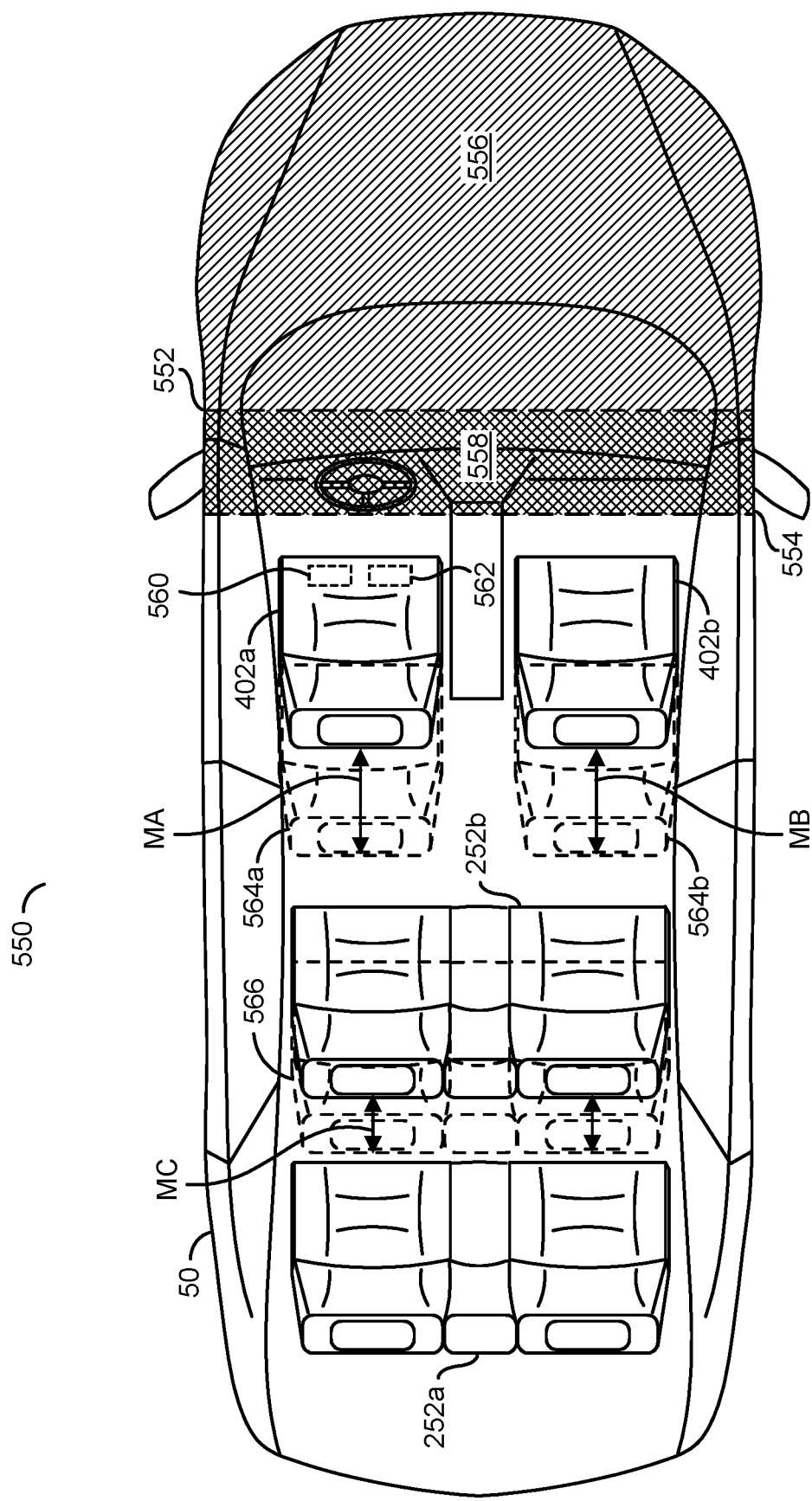
FIG. 10 is a diagram illustrating moving seats back in response to detecting a potential collision.

Referring to FIG. 10, a diagram illustrating moving seats back in response to detecting a potential collision is shown. A top down view 550 of the ego vehicle 50 is shown. The front seats 402a-402b, the back row of seats 252a and the middle row of seats 252b of the ego vehicle 50 are shown in the top down view 550.

A line 552 and a line 554 are shown across the ego vehicle 50. The line 552 may represent a length of the crumple zone when the seats 402a-402b are in a standard position (e.g., driving position). The line 554 may represent an increased length of the crumple zone after the seats 402a-402b are moved backwards.

A shaded area 556 is shown on the ego vehicle 50. The shaded area 556 may represent a standard crumple zone. The standard crumple zone 556 may be a portion of the ego vehicle 50 from the front end of the ego vehicle 50 to the line 552. A shaded area 558 is shown on the ego vehicle 50. The shaded area 558 may represent an increased crumple zone. The increased crumple zone 558 may be an additional portion of the ego vehicle 50 that is available (e.g., unoccupied by body parts of a person) when the seats 402a-402b are moved backwards within the cabin of the ego vehicle 50. The increased amount of the ego vehicle 50 in the shaded area 558 may absorb the impact corresponding to the potential collision and/or keep potentially harmful objects (e.g., the steering wheel 502, a portion of the engine, the dashboard, shattered glass, etc.) caused by the impact away from the occupants of the ego vehicle 50.

The increased crumple zone 558 may extend to the line 554. The processors 106a-106n may increase the size of the crumple zone of the ego vehicle 50 from the standard crumple zone 556 to the increased crumple zone 558 in addition to the standard crumple zone 556. Increasing the size of the crumple zone to include the increased crumple zone 558 may provide more unoccupied area of the ego vehicle 50 to absorb the force of the impact as well as move space between the driver 202 and potentially harmful objects that may be pushed back into the cabin of the ego vehicle 50 from the collision. The sizes of the standard crumple zone 556 and the increased crumple zone 558 are shown as representative examples. The amount of space of the standard crumple zone 556 and the amount of increased crumple zone 558 made available by the processors 106a-106n moving back the seats 402a-402b may be varied according to the design criteria of a particular implementation.

A block (or circuit) 560 and/or a block (or circuit) 562 are shown within the driver seat 402a. In the example shown, the circuits 560-562 are shown in the driver seat 402a as a representative example. However, the circuits 560-562 may be implemented in each of the seats 402a-402n, and/or each row of seats 252a-252n. The circuits 560-562 may be examples of the actuators 116. The circuit 560 may implement a mechanism for moving the car seats 402a-402n. For example, the circuit 560 may be a standard seat movement actuator (e.g., used by the occupants to move the seats as desired). The circuit 562 may implement a mechanism for moving the car seats 402a-402n. For example, the circuit 562 may be an alternate mechanism for moving the car seats 402a-402n.

In some embodiments, the apparatus 100 may be configured to interface with the standard seat mechanism 560. For example, the signal VCTRL may be generated to actuate the standard seat mechanism 560 (e.g., a mechanism available to the occupants of the ego vehicle 50 for manually adjusting the position of the seats 402a-402n) to cause the associated one of the seats 402a-402n to move. Generally, the standard seat mechanism 560 moves the seat slowly. However, the frame of time in which the apparatus 100 causes the standard seat mechanism 560 to move the seats 402a-402n to respond to the imminent collision may be enough to move the seats 402a-402n back far enough. Interfacing with the standard seat mechanism 560 may enable the impact mitigation of the apparatus 100 to be implemented as a retrofit without installing additional hardware in each of the seats 402a-402n.

In some embodiments, the apparatus 100 may be configured to interface with the alternate mechanism 562. For example, the signal VCTRL may be generated to cause the alternate mechanism 562 to cause the associated one of the seats 402a-402n to move. The alternate seat mechanism 562 may be configured as a separate mechanism from the standard seat mechanism 560. The alternate seat mechanism 562 may be configured to move the seats 402a-402n faster than the standard seat mechanism 560. For example, the standard seat mechanism 560 may be implemented to enable the occupants of the ego vehicle 50 to manually adjust the position of the seats 402a-402n and the alternate seat mechanism 562 may be implemented to enable the processors 106a-106n to cause the seats 402a-402n to move in response to the detection of a potential and/or imminent collision. In one example, implementing the alternate seat mechanism 562 may enable the seats 402a-402n to be moved back faster when the driver 202 is sitting closer to the steering wheel 502.

In some embodiments, the processors 106a-106n may be configured to cause the seats 402a-402n to move outside of a standard movement range. In an example, using the standard seat mechanism 560, the occupant may manually select the location of the seats 402a-402n within a pre-defined range. The occupants may be unable to select a location that is outside of the pre-defined range. Using the standard seat mechanism 560 and/or the alternate seat mechanism 562, the processors 106a-106n may cause the seats 402a-402n to move outside of the pre-defined range (e.g., select a seat location that is unavailable to the occupants).

In the interior of the ego vehicle 50, the seats 402a-402b, and the rows of seats 252a-252b are shown arranged in a first location. For example, the seats 402a-402b, and the rows of seats 252a-252b shown may be the position of the seats while the ego vehicle 50 is being driven. Movement locations 564a-564b and a movement location 566 are shown. The movement location 564a may represent a location that the driver seat 402a may move to in response to the potential and/or imminent collision. In the example shown, the driver seat 402a may move back a distance MA to the movement location 564a. The movement location 564b may represent a location that the passenger seat 402b may move to in response to the potential and/or imminent collision. In the example shown, the passenger seat 402b may move back a distance MB to the movement location 564b. The movement location 566 may represent a location that the middle seat row 252b may move to in response to the potential and/or imminent collision. In the example shown, the middle seat row 252b may move back as a unit a distance MC to the movement location 566. In another example, each seat 402a-402n of the middle seat row 252b may be moved independently.

In the example shown, the distance MA and the distance MB may be equal. However, the distance that each of the seats 402a-402n may be moved in response to the collision may be varied according to the angle of impact A and/or the other occupants in the ego vehicle 50. For example, if no passenger 504 is detected, the seat 402b may not move. In another example, if there is an occupant behind the passenger seat 402b and no occupant behind the driver seat 402a, then the distance MA may be greater than the distance MB. In yet another example, if there angle of impact A indicates that the impact may occur on the driver side of the ego vehicle 50, then the distance MA greater than the distance MB (e.g., the passenger may not be affected by the impact as much as the driver 202).

In the example shown, the back seat row 252a is shown as not moving. In some vehicles, the back seat row 252a may be incapable of moving. In some vehicles all the rows of seats 252a-252n may be capable of moving. In one example, if the back row 252a and the middle row 252b are unoccupied, the distance MC may be increased as far as possible and the distances MA and MB may be moved as far back as possible to increase how far back the seats 402a-402n are capable of being moved (e.g., since no considerations are needed for other occupants, more room can be made to increase the size of the increased crumple zone 558). In the example shown, the seats 402a-402b and the middle row of seats 252b are shown being moved backwards. However, if the vehicle 50 has moveable rear seats 252a and/or the seats 402a-402n are capable of moving in all directions, then the seats 402a-402n may be moved in alternate directions based on the angle of impact A. For example, for a rear impact, the seats 402a-402b and the middle row of seats 252b may be moved forward and the back row of seats 252a may have room to be moved forwards as well. The method and/or movement of the seats 402a-402n may be varied according to the design criteria of a particular implementation.

Figure 11:
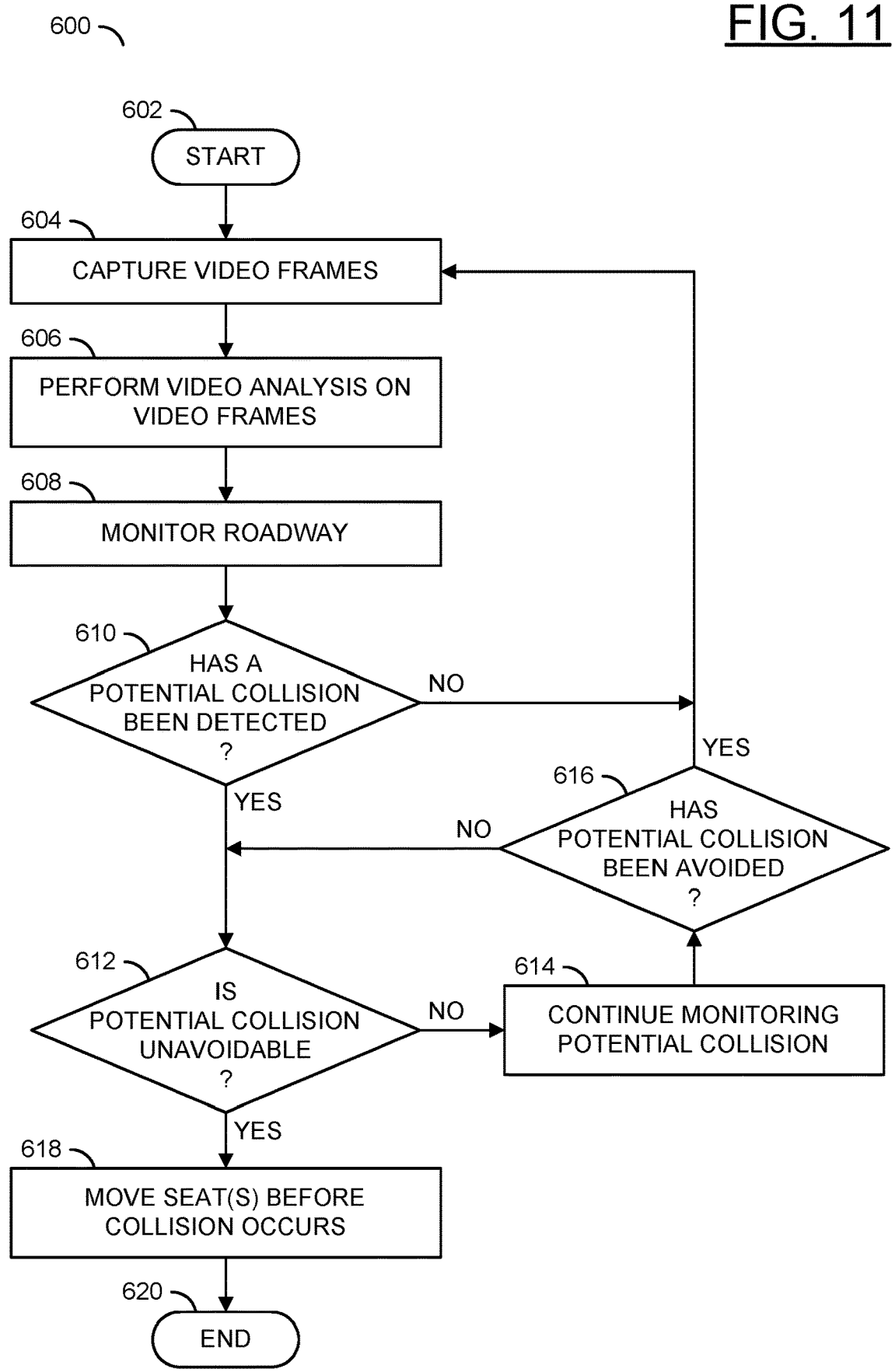
FIG. 11 is a flow diagram illustrating a method for moving a position of a seat in response to a collision.

Referring to FIG. 11, a method (or process) 600 is shown. The method 600 may move a position of a seat in response to a collision. The method 600 generally comprises a step (or state) 602, a step (or state) 604, a step (or state) 606, a step (or state) 608, a decision step (or state) 610, a decision step (or state) 612, a step (or state) 614, a decision step (or state) 616, a step (or state) 618, and a step (or state) 620.

The step 602 may start the method 600. In the step 604, the capture devices 102a-102n may capture video frames (e.g., the signals FRAMES_A-FRAMES_N) of an area exterior and/or interior to the ego vehicle 50. Next, in the step 606, the processors 106a-106n (e.g., the CNN module 150) may perform video analysis on the captured video frames FRAMES_A-FRAMES_N. In the step 608, the processors 106a-106n may monitor the roadway 56 using the computer vision operations and/or information from the sensors 114. Next, the method 600 may move to the decision step 610.

In the decision step 610, the decision module 158 may determine whether a potential collision has been detected. For example, the potential collision may be determined based on a trajectory of the incoming object 52, the angle of impact A and/or the trajectory of the ego vehicle 50. If no potential collision has been detected, the method 600 may return to the step 604. If a potential collision has been detected, the method 600 may move to the decision step 612.

In the decision step 612, the decision module 158 may determine whether the potential collision is avoidable. For example, the potential collision may be avoidable if there is time for evasive maneuvers to be implemented and/or may depend on how much time until the potential impact may occur. If the collision is potentially avoidable, the method 600 may move to the step 614. In the step 614, the processors 106a-106n may continue monitoring the potential collision (e.g., whether the object 52 changes direction, whether evasive action has changed the scenario, etc.). Next, the method 600 may move to the decision step 616.

In the decision step 616, the decision module 158 may determine whether the potential collision has been avoided. For example, the potential collision may not occur (e.g., due to an evasive maneuver and/or a change in circumstances) and may no longer pose a threat. If the potential collision has been avoided, the method 600 may return to the step 604. If the potential collision has not been avoided (e.g., a collision may still occur), then the method 600 may return to the decision step 612.

In the decision step 612, if the potential collision is determined to be unavoidable (e.g., the collision is imminent), then the method 600 may move to the step 618. For example, the processors 106a-106n may wait until the collision becomes imminent (e.g., unavoidable) before moving the seats 402a-402n. In the step 618, the processors 106a-106n may move one or more of the seat(s) 402a-402n before an impact corresponding to the collision occurs. For example, the processors 106a-106n may generate the signal VCTRL for the actuators 116. Next, the method 600 may move to the step 620. The step 620 may end the method 600.

Figure 12:
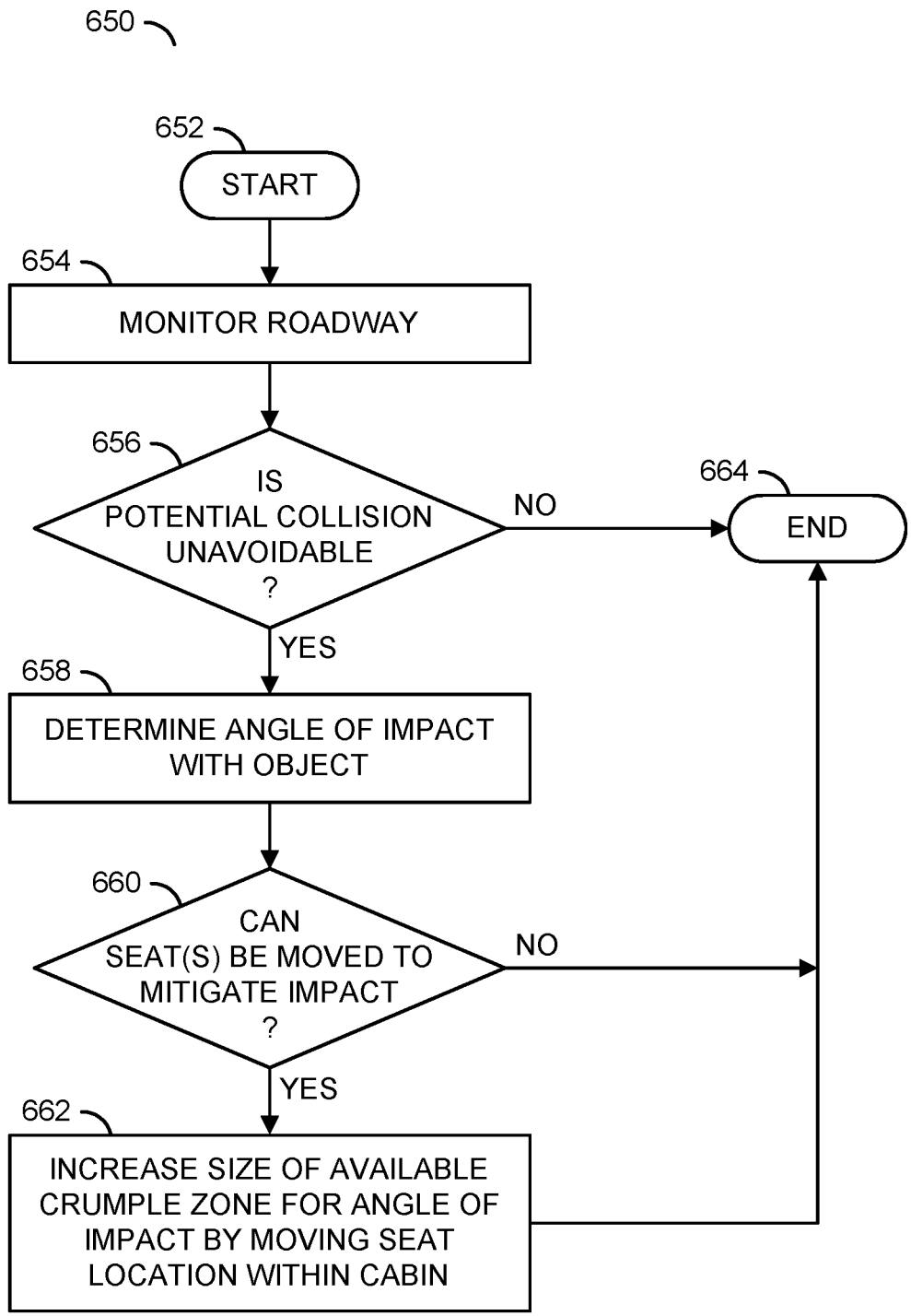
FIG. 12 is a flow diagram illustrating a method for increasing a size of a crumple zone.

Referring to FIG. 12, a method (or process) 650 is shown. The method 650 may increase a size of a crumple zone. The method 650 generally comprises a step (or state) 652, a step (or state) 654, a decision step (or state) 656, a step (or state) 658, a decision step (or state) 660, a step (or state) 662, and a step (or state) 664.

The step 652 may start the method 650. In the step 654, the processors 106a-106n may monitor the roadway 382 using the computer vision operations and/or data read from the sensors 114. Next, the method 650 may move to the decision step 656.

In the decision step 656, the decision module 158 may determine whether the potential collision is unavoidable. If the potential collision is avoidable, the method 650 may move to the step 664. If the potential collision is unavoidable, the method 650 may move to the step 658. In the step 658, the processors 106a-106n may determine the angle of impact A with the unavoidable object 384. The angle of impact A may be determined using computer vision operations to predict the trajectory of the unavoidable object 384, the trajectory of the ego vehicle 50 and/or reading the sensor data 114 (e.g., determined by the sensor fusion module 152) Next, the method 650 may move to the decision step 660.

The decision step 660 may determine whether the seat(s) 402a-402n may be moved to mitigate the impact from the unavoidable collision. For example, the processors 106a-106n may compare the angle of impact A, with the direction(s) that the seats 402a-402n are capable of moving (e.g., whether the seats are capable of moving side-to-side for a side impact). If the seats 402a-402n cannot be moved to mitigate the impact, the method 650 may move to the step 664. If the seats 402a-402n can be moved to mitigate the impact, the method 650 may move to the step 662.

In the step 662, the processors 106a-106n may increase the size of the available crumple zone (e.g., from the crumple zone 556 to also include the increased crumple zone 558) for the angle of impact A by moving the location of the seats 402a-402n within the cabin of the ego vehicle 50. Next, the method 650 may move to the step 664. The step 664 may end the method 650.

Figure 13:
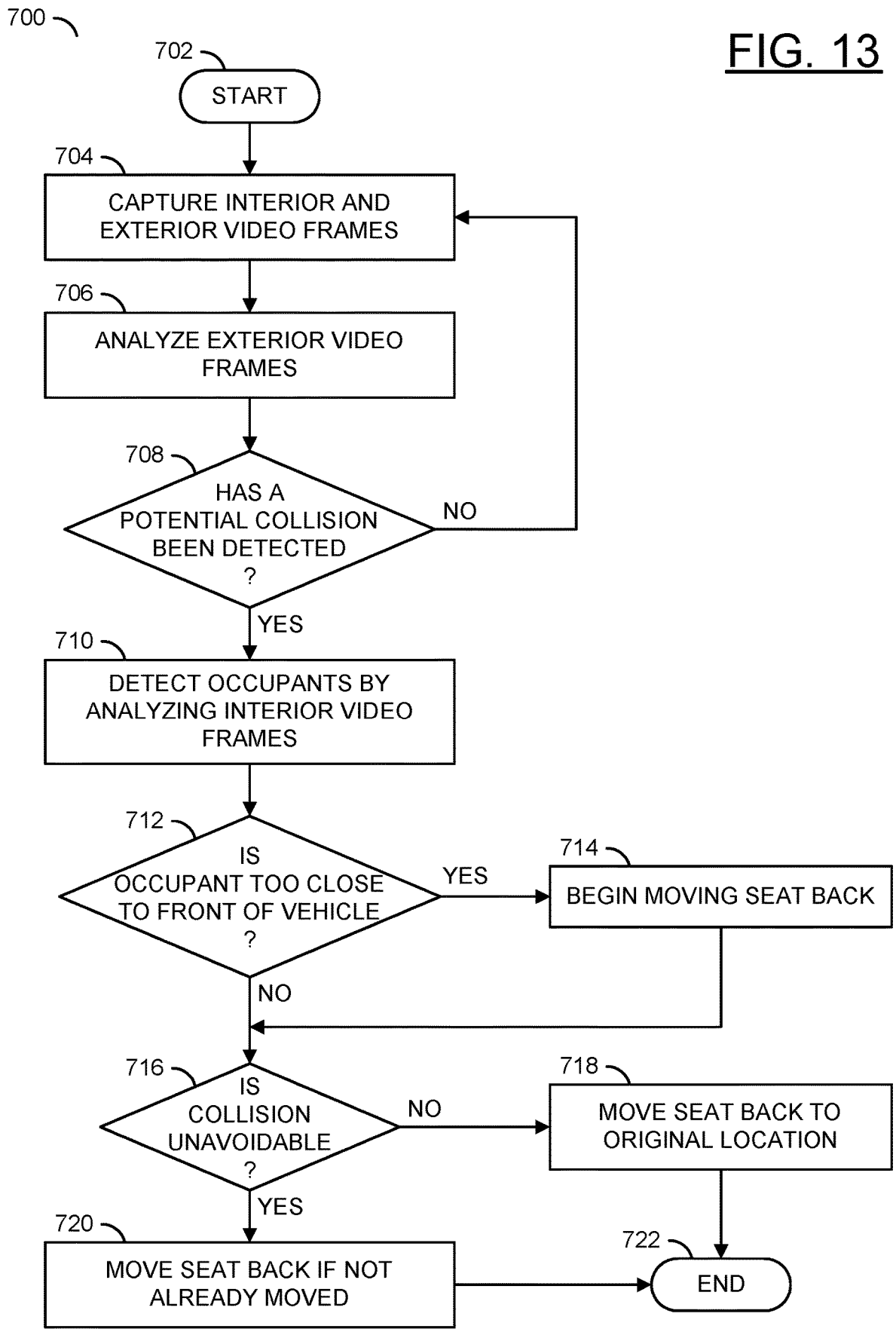
FIG. 13 is a flow diagram illustrating a method for moving a seat in response to a position of the driver.

Referring to FIG. 13, a method (or process) 700 is shown. The method 700 may move a seat in response to a position of the driver. The method 700 generally comprises a step (or state) 702, a step (or state) 704, a step (or state) 706, a decision step (or state) 708, a step (or state) 710, a decision step (or state) 712, a step (or state) 714, a decision step (or state) 716, a step (or state) 718, a step (or state) 720, and a step (or state) 722.

The step 702 may start the method 700. In the step 704, one or more of the capture devices 102a-102n may be configured as exterior facing cameras to capture video frames (e.g., the video frames FRAMES_A-FRAMES_N) of an area exterior to the ego vehicle 50. In the step 706, the processors 106a-106n may analyze the exterior video frames FRAMES_A-FRAMES_N. Next, the method 700 may move to the decision step 708.

In the decision step 708, the decision module 158 may determine whether a potential collision has been detected. If no potential collision has been detected, the method 700 may return to the step 704. If a potential collision has been detected, the method 700 may move to the step 710. In the step 710, the processors 106a-106n may detect occupants in the ego vehicle 50 by analyzing the video frames FRAMES_A-FRAMES_N captured by the capture devices 102a-102n configured as interior-facing cameras. Next, the method 700 may move to the decision step 712.

In the decision step 712, the processors 106a-106n may determine whether the occupant (e.g., the driver 202) is too close to the front of the ego vehicle 50 (e.g., sitting too close to the steering wheel 502). If the occupant is too close to the front of the ego vehicle 50, then the method 700 may move to the step 714.

In the step 714, the processors 106a-106n may generate the signal VCTRL to begin moving the corresponding (e.g., occupied) seat(s) 402a-402n back (e.g., before the collision has been determined to be imminent and/or unavoidable). Next, the method 700 may move to the decision step 716. In the decision step 712, if the occupant is not too close to the front of the ego vehicle 50, the method 700 may move to the decision step 716.

In the decision step 716, the decision module 158 may determine whether the collision with the object 384 is unavoidable. If the collision can be avoided, the method 700 may move to the step 718. In the step 718, the processors 106a-106n may generate the signal VCTRL to move the seats 402a-402n to the original location (e.g., the previous location used while driving). Next, the method 700 may move to the step 722.

In the decision step 716, if the collision is unavoidable, the method 700 may move to the step 720. In the step 720, the processors 106a-106n may move any seats 402a-402n backwards that have not already been moved (e.g., from the step 714). Next, the method 700 may move to the step 722. The step 722 may end the method 700.

Referring to FIG. 14, a method (or process) 750 is shown. The method 750 may adjust seat positions based on seat occupancy. The method 750 generally comprises a step (or state) 752, a step (or state) 754, a decision step (or state) 756, a step (or state) 758, a decision step (or state) 760, a step (or state) 762, a decision step (or state) 764, a decision step (or state) 766, a step (or state) 768, a step (or state) 770, and a step (or state) 772.

The step 752 may start the method 750. In the step 754, the processors 106a-106n may analyze the interior and/or exterior video frames FRAMES_A-FRAMES_N captured by the capture devices 102a-102n. Next, the method 750 may move to the decision step 756. In the decision step 756, the decision module 158 may determine whether an unavoidable collision has been detected. If not, the method 750 may return to the step 754. If an unavoidable collision has been detected, the method 750 may move to the step 758. In the step 758, the processors 106a-106n may determine which of the seats 402a-402n are occupied. For example, the sensor fusion module 152 may analyze the sensors 114 (e.g., pressure sensors) and/or results of the computer vision analysis. Next, the method 750 may move to the decision step 760.

In the decision step 760, the processors 106a-106n may determine whether one of the seats 402a-402n is occupied. If the seat is not occupied, the method 750 may move to the step 762. In the step 762, the processors 106a-106n may not move the seats 402a-402n that are not occupied. Next, the method 750 may move to the step 772. In the decision step 760, if the particular one of the seats 402a-402n is occupied, the method 750 may move to the decision step 764. In the decision step 764, the processors 106a-106n may determine whether the seat behind the particular one of the seats 402a-402n is occupied (e.g., one of the seats 402a-402n in the middle row of seats 252b). If the seat behind is not occupied, the method 750 may move to the step 768. If the seat behind is occupied, the method 750 may move to the decision step 766.

In the decision step 766, the processors 106a-106n may determine whether moving the particular one of the seats 402a-402n will affect the back seat occupant (e.g., take up too much room, crush the legs of the back seat occupant, injure the back seat occupant, etc.). If moving the seat back will not affect the back occupant, the method 750 may move to the step 768. In the step 768, the processors 106a-106n may generate the signal VCTRL to initiate the movement of the particular one of the seats 402a-402n. Next, the method 750 may move to the step 772.

In the decision step 766, if moving the particular one of the seats 402a-402n will affect the back occupant, the method 750 may move to the step 770. In the step 770, the processors 106a-106n may perform a balancing between increasing the size of the crumple zone with the effect on the back occupant. Next, the method 750 may move to the step 772. The step 772 may end the method 750.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface to receive pixel data corresponding to an area outside of a vehicle; and
a processor to (i) process said pixel data arranged as video frames, (ii) perform operations to detect objects in said video frames, (iii) determine whether a potential collision is unavoidable based on said objects detected in said video frames and (iv) generate a signal if said potential collision is unavoidable, wherein (a) a position of a seat in said vehicle is moved in response to said signal, (b) said position of said seat is moved before an impact corresponding to said potential collision occurs, (c) said seat is one of a plurality of seats and (d) said processor further adjusts positions of one or more of said plurality of seats if said potential collision is unavoidable.

2. The apparatus according to claim 1, wherein said position of said seat is moved away from a front of said vehicle.

3. The apparatus according to claim 1, wherein moving said position of said seat before said impact occurs increases an available amount of said vehicle for absorbing said impact while keeping potentially harmful objects caused by said impact away from occupants of said vehicle.

4. The apparatus according to claim 3, wherein said available amount of said vehicle for absorbing said impact is a crumple zone of said vehicle.

5. The apparatus according to claim 1, wherein (i) said vehicle comprises a mechanism available to occupants of said vehicle for manually adjusting said position of said seat and (ii) said mechanism comprises an actuator to actuate automatically in response to said signal to adjust said position of said seat.

6. The apparatus according to claim 5, wherein said apparatus is installed as a retrofit for said vehicle.

7. The apparatus according to claim 1, wherein said signal automatically actuates a first mechanism that moves said position of said seat faster than a second mechanism that manually adjusts said position of said seat.

8. An apparatus comprising:
an interface to receive pixel data corresponding to an area outside of a vehicle; and
a processor to (i) process said pixel data arranged as video frames, (ii) perform operations to detect objects in said video frames, (iii) determine whether a potential collision is unavoidable based on said objects detected in said video frames and (iv) generate a signal if said potential collision is unavoidable, wherein (a) a position of a seat in said vehicle is moved in response to said signal, (b) said position of said seat is moved before an impact corresponding to said potential collision occurs and (c) a component of said vehicle moves away from an occupant of said vehicle before said impact occurs in response to said signal.

9. The apparatus according to claim 8, wherein said component of said vehicle is a steering wheel.

10. An apparatus comprising:
an interface to receive pixel data corresponding to an area outside of a vehicle; and
a processor to (i) process said pixel data arranged as video frames, (ii) perform operations to detect objects in said video frames, (iii) determine whether a potential collision is unavoidable based on said objects detected in said video frames, (iv) determine an angle of said potential collision and (v) generate a signal if said potential collision is unavoidable, wherein (a) a position of a seat in said vehicle is moved in response to said signal, (b) said position of said seat is moved before an impact corresponding to said potential collision occurs and (c) said signal adjusts said seat in response to said angle of said potential collision.

11. The apparatus according to claim 10, wherein (i) said signal is generated when said processor detects that said angle of said potential collision is a frontal collision and (ii) said seat is moved back within a cabin of said vehicle.

12. An apparatus comprising:
an interface to receive (a) first pixel data corresponding to an area outside of a vehicle and (b) second pixel data corresponding to an area inside of said vehicle; and
a processor to (i) process said first pixel data arranged as video frames and said second pixel data arranged as interior video frames, (ii) perform operations to detect objects in said video frames and said interior video frames, (iii) determine whether a potential collision is unavoidable based on said objects detected in said video frames and (iv) generate a signal if said potential collision is unavoidable, wherein (a) a position of a seat in said vehicle is moved in response to said signal and (b) said position of said seat is moved before an impact corresponding to said potential collision occurs.

13. The apparatus according to claim 12, wherein (i) said operations determine a body position of a driver based on said objects detected in said interior video frames and (ii) said signal causes said seat to move based on said body position of said driver.

14. The apparatus according to claim 13, wherein (i) said operations determine that said body position of said driver is close to a steering wheel and (ii) said processor generates said signal earlier when said driver is close to said steering wheel than when said driver is farther away from said steering wheel.

15. The apparatus according to claim 12, wherein said operations determine whether said seat is occupied based on said objects detected in said interior video frames.

16. The apparatus according to claim 15, wherein said processor does not generate said signal to move said seat if said seat is unoccupied.

17. The apparatus according to claim 15, wherein (i) said operations determine whether a second seat is occupied that is located behind said seat and (ii) said processor balances moving said position of said seat with an amount of space for a person occupying said second seat.

18. The apparatus according to claim 12, wherein (i) said operations determine a body size of a driver based on said objects detected in said interior video frames and (ii) said signal causes said seat to move based on said body size of said driver.

19. The apparatus according to claim 18, wherein said processor generates said signal earlier when said operations determine said body size of said driver is large compared to an amount of space for absorbing said potential collision.

* * * * *